(12) United States Patent
Ando et al.

(10) Patent No.: US 10,079,961 B2
(45) Date of Patent: Sep. 18, 2018

(54) DATA PROCESSING APPARATUS, DATA PROCESSING METHOD, AND NON-TRANSITORY COMPUTER READABLE MEDIUM FOR CHANGING A VALUE OF A SETTING ITEM

(71) Applicant: FUJI XEROX CO., LTD., Tokyo (JP)

(72) Inventors: Jun Ando, Kanagawa (JP); Masahiro Iwata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/247,202

(22) Filed: Aug. 25, 2016

(65) Prior Publication Data

US 2017/0264787 A1  Sep. 14, 2017

(30) Foreign Application Priority Data

Mar. 9, 2016 (JP) ................. 2016-046239

(51) Int. Cl.
*H04N 1/44* (2006.01)
*G06F 3/12* (2006.01)
*H04N 1/00* (2006.01)

(52) U.S. Cl.
CPC ....... *H04N 1/4433* (2013.01); *H04N 1/00411* (2013.01); *H04N 1/00419* (2013.01); *H04N 1/4413* (2013.01); *H04N 1/00506* (2013.01); *H04N 2201/0094* (2013.01)

(58) Field of Classification Search
None
See application file for complete search history.

(56) References Cited

U.S. PATENT DOCUMENTS

| 6,515,684 B1* | 2/2003 | Knodt | H04N 1/00408 |
| | | | 358/1.15 |
| 8,464,338 B2* | 6/2013 | Okubo | G06F 21/31 |
| | | | 726/19 |
| 2010/0212023 A1 | 8/2010 | Asahara | |
| 2013/0100474 A1* | 4/2013 | Ono | H04N 1/00474 |
| | | | 358/1.13 |
| 2014/0063550 A1* | 3/2014 | Wilen | G06F 3/1204 |
| | | | 358/1.15 |
| 2016/0072971 A1* | 3/2016 | Ozaki | H04N 1/00482 |
| | | | 358/1.15 |

(Continued)

FOREIGN PATENT DOCUMENTS

| JP | 2002-232663 A | 8/2002 |
| JP | 2007-251289 A | 9/2007 |
| JP | 2010-191687 A | 9/2010 |

*Primary Examiner* — Miya J Williams
(74) *Attorney, Agent, or Firm* — Oliff PLC

(57) ABSTRACT

A data processing apparatus includes a reading unit, an extraction unit, and a rewriting unit. The reading unit reads, in a case where an instruction for changing a value of a setting item regarding a service to be provided by the data processing apparatus is issued by a user, a value of the instructed setting item before the change from a predetermined storing region. The extraction unit extracts shortcut information including the value before the change as a parameter value from among plural pieces of shortcut information each including a parameter for shortcut launching of a service to be provided by the data processing apparatus. The rewriting unit rewrites the parameter value included in the extracted shortcut information to a designated value.

9 Claims, 20 Drawing Sheets

| ServiceID | jp.co.aaabbb・・・app.InkLifting_shortcut1 |
|---|---|
| Before | hoge@aaabbb.co.jp |
| After | fuji-taro@aaabbb.co.jp |

(56) References Cited

U.S. PATENT DOCUMENTS

| | | | |
|---|---|---|---|
| 2016/0088176 A1* | 3/2016 | Maekawa | H04N 1/00482 358/1.15 |
| 2016/0188273 A1* | 6/2016 | Mochizuki | G06F 3/1205 358/1.15 |
| 2016/0295033 A1* | 10/2016 | Hirasawa | H04N 1/0097 |
| 2017/0070624 A1* | 3/2017 | Hanada | G03G 15/502 |
| 2017/0094082 A1* | 3/2017 | Ando | H04N 1/00411 |
| 2017/0168694 A1* | 6/2017 | Liu | G06F 3/04847 |

* cited by examiner

FIG. 4

| | | |
|---|---|---|
| applicationID | "AAAapplication" | } IDENTIFICATION PARAMETER |
| serviceID | "XXXService" | |
| title | "XXX" | } DISPLAY PARAMETER |
| iconID | "XXXServiceIcon" | |
| availability | TRUE | |
| accessibility | FALSE | |
| isShortcut | TRUE | |
| launchArgs | ● | |

20

LAUNCH PARAMETER

| Parameter1 | "AAA" |
|---|---|
| Parameter2 | "BBB" |
| Parameter3 | TRUE |
| ... | |
| ParameterN | "XXX" |

FIG. 8

| Before | fuji.taro@aaabbb.co.jp |
| --- | --- |
| After | fuji-taro@aaabbb.co.jp |

FIG. 9

| ServiceID | jp.co.aaabbb···app.InkLifting_shortcut1 |
| --- | --- |
| Before | hoge@aaabbb.co.jp |
| After | fuji.taro@aaabbb.co.jp |

FIG. 10

| ServiceID | jp.co.aaabbb···app.InkLifting_shortcut1 |
|---|---|
| Before | hoge@aaabbb.co.jp |
| After | *fuji-taro@aaabbb.co.jp* |

FIG. 11

| ServiceID | jp.co.aaabbb···app.InkLifting_shortcut1 |
|---|---|
| UserID | Fx111111 |
| SendAddress | *fuji.taro@aaabbb.co.jp* |
| OldDocument | /var/tmp/old.pdf |
| NewDocument | /var/tmp/new.pdf |

FIG. 14

| ServiceID | jp.co.aaabbb···app.InkLifting_shortcut1 |
|---|---|
| UserID | Fx111111 |
| SendAddress | *fuji-taro@aaabbb.co.jp* |
| OldDocument | /var/tmp/old.pdf |
| NewDocument | /var/tmp/new.pdf |

FIG. 15

| ServiceID | jp.co.aaabbb···app.InkLifting_shortcut1 |
|---|---|
| Factor | fuji.taro@aaabbb.co.jp |

FIG. 16

| ApplicationID | jp.co.aaabbb···app.InkLifting |
|---|---|
| ServiceID | jp.co.aaabbb···app.InkLifting_shortcut1 |
| ⋮ | ⋮ |
| *Availability* | *FALSE* |
| ⋮ | ⋮ |

FIG. 17

| ServiceID | jp.co.aaabbb···app.InkLifting_shortcut1 |
|---|---|
| Before | fuji.taro@aaabbb.co.jp |
| After | fuji-taro@aaabbb.co.jp |

FIG. 19

| ServiceID | jp.co.aaabbb···app.InkLifting_shortcut2 |
|---|---|
| Factor | *fuji-taro@aaabbb.co.jp* |

FIG. 22

| ApplicationID | jp.co.aaabbb···app.InkLifting |
|---|---|
| ServiceID | jp.co.aaabbb···app.InkLifting_shortcut2 |
|  |  |
| ⋮ | ⋮ |
| *Availability* | *TRUE* |
| ⋮ | ⋮ |

DATA PROCESSING APPARATUS, DATA PROCESSING METHOD, AND NON-TRANSITORY COMPUTER READABLE MEDIUM FOR CHANGING A VALUE OF A SETTING ITEM

CROSS-REFERENCE TO RELATED APPLICATIONS

This application is based on and claims priority under 35 USC 119 from Japanese Patent Application No. 2016-046239 filed Mar. 9, 2016.

BACKGROUND

Technical Field

The present invention relates to a data processing apparatus, a data processing method, and a non-transitory computer readable medium.

SUMMARY

According to an aspect of the invention, there is provided a data processing apparatus including a reading unit, an extraction unit, and a rewriting unit. The reading unit reads, in a case where an instruction for changing a value of a setting item regarding a service to be provided by the data processing apparatus is issued by a user, a value of the instructed setting item before the change from a predetermined storing region. The extraction unit extracts shortcut information including the value before the change as a parameter value from among plural pieces of shortcut information each including a parameter for shortcut launching of a service to be provided by the data processing apparatus. The rewriting unit rewrites the parameter value included in the extracted shortcut information to a designated value.

BRIEF DESCRIPTION OF THE DRAWINGS

Exemplary embodiments of the present invention will be described in detail based on the following figures, wherein:

FIG. 4 is a diagram illustrating an example of service information;

FIG. 8 is a diagram illustrating an example of a data set stored in a temporary storing unit;

FIG. 9 is a diagram illustrating an example of follow-up target information;

FIG. 10 is a diagram illustrating an example of rewritten follow-up target information;

FIG. 11 is a diagram illustrating an example of extracted shortcut information;

FIG. 14 is a diagram illustrating an example of shortcut information in which a launch parameter value is rewritten;

FIG. 15 is a diagram illustrating an example of invalidation target information;

FIG. 16 is a diagram illustrating an example of shortcut information in which a parameter value of a display state is changed;

FIG. 17 is a diagram illustrating an example of follow-up target information;

FIG. 19 is a diagram illustrating an example of invalidation target information;

FIG. 22 is a diagram illustrating an example of shortcut information; and

DETAILED DESCRIPTION

[1] Configuration

Figure 1:
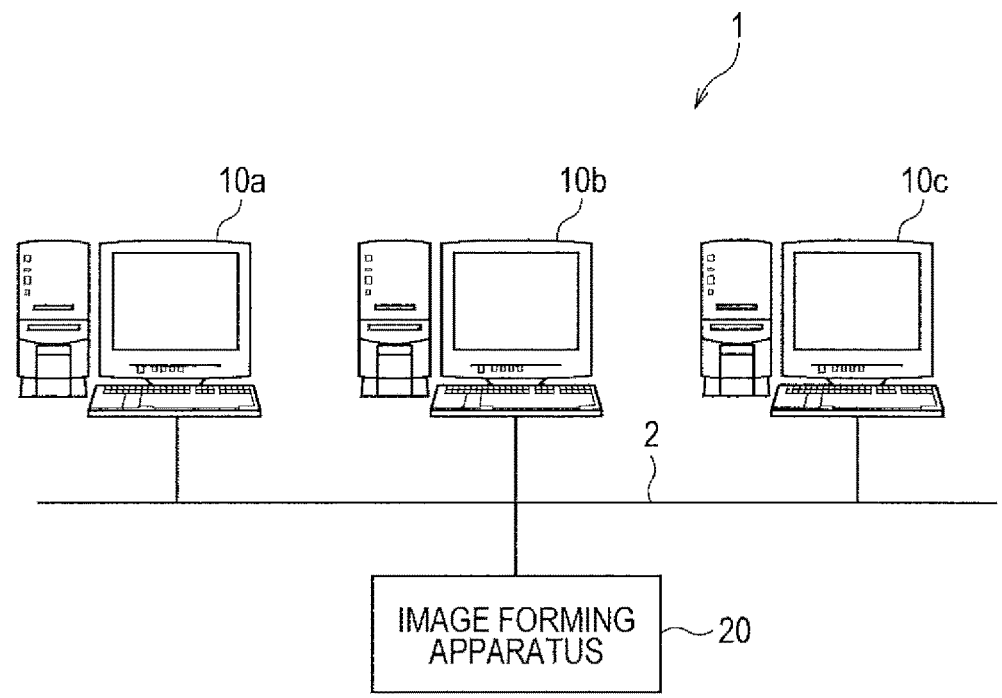
FIG. 1 is a schematic diagram illustrating a configuration of a system.

FIG. 1 is a schematic diagram illustrating a configuration of a system 1 according to an exemplary embodiment. The system 1 includes client apparatuses 10a, 10b, and 10c and an image forming apparatus 20 (an example of a data processing apparatus). The client apparatuses 10a, 10b, and 10c are apparatuses operated by users, and are, for example, personal computers. When the client apparatuses 10a, 10b, and 10c are not distinguished from one another, they are referred to as a "client apparatus 10". The image forming apparatus 20 is an apparatus which provides services including copying, scanning, facsimile transmission, and printing (output of image data to a medium) to a user. The image forming apparatus 20 performs processing such as image forming processing for forming an image on a medium (printing processing) and image reading processing for reading an image formed on a medium. The above processing is performed when a service such as copying, scanning, facsimile transmission, and printing is provided to a user. A communication line 2 includes at least one or more of, for example, the Internet, a mobile communication network, and a telephone line. The client apparatus 10 and the image forming apparatus 20 are connected to the communication line 2.

The image forming apparatus 20 is shared by plural users. Therefore, a personal account is created for each user of the image forming apparatus 20, and user authentication is performed based on account information. Setting information regarding a service provided by the image forming apparatus 20 is stored for each user in the image forming apparatus 20. Setting information includes, for example, information regarding printing such as "double-sided/single-sided" and "color/monochrome", information regarding a user (for example, an email address), and shortcut information for shortcut launching of a service. In this exemplary embodiment, users of the image forming apparatus 20 are roughly classified into general users and administrators. General users are users who do not have authority for changing setting of another user. In contrast, administrators have authority for editing setting information of a general user.

Figure 2:
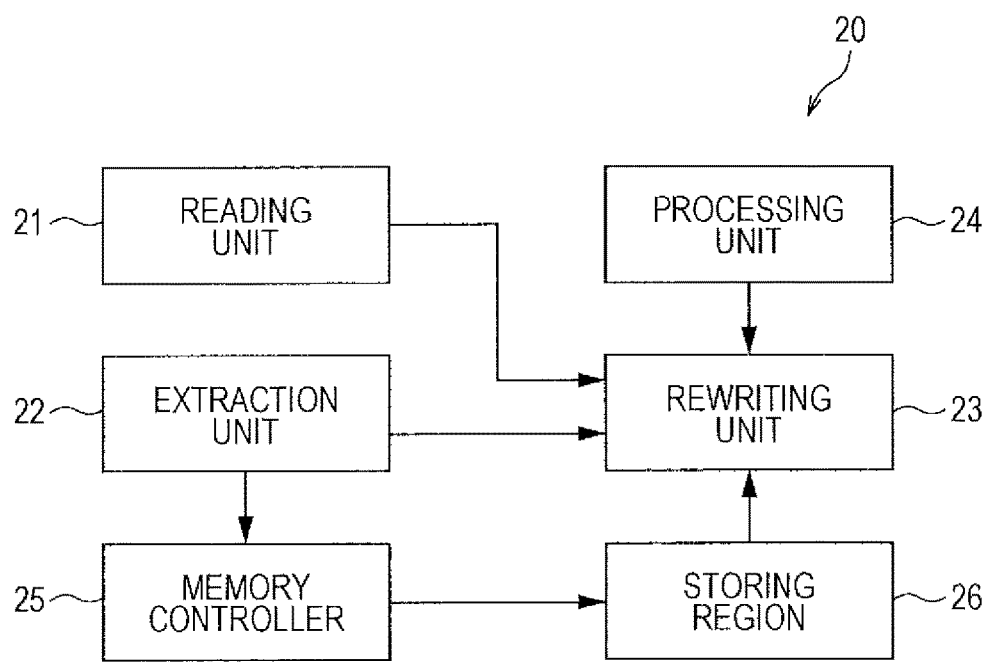
FIG. 2 is a diagram illustrating a functional configuration of an image forming apparatus.

FIG. 2 is a diagram illustrating an example of a functional configuration of the image forming apparatus 20. The image forming apparatus 20 includes a reading unit 21, an extraction unit 22, a rewriting unit 23, a processing unit 24, a memory controller 25, and a storing region 26. In the case where an instruction for changing a value of a setting item is issued by a user, the reading unit 21 reads a value of the instructed setting item before the change from a predetermined storing region. The extraction unit 22 extracts shortcut information including the read value before the change as a parameter value from among plural pieces of shortcut information including parameters for shortcut launching of services to be provided by the image forming apparatus 20. The rewriting unit 23 rewrites the parameter value included in the extracted shortcut information to a designated value.

The processing unit 24 performs processing for allowing a user to select whether or not to change the parameter value included in the extracted shortcut information. The memory controller 25 stores the extracted shortcut information and the values of the instructed setting item before and after the change in association with one another in the predetermined storing region 26.

Figure 3:
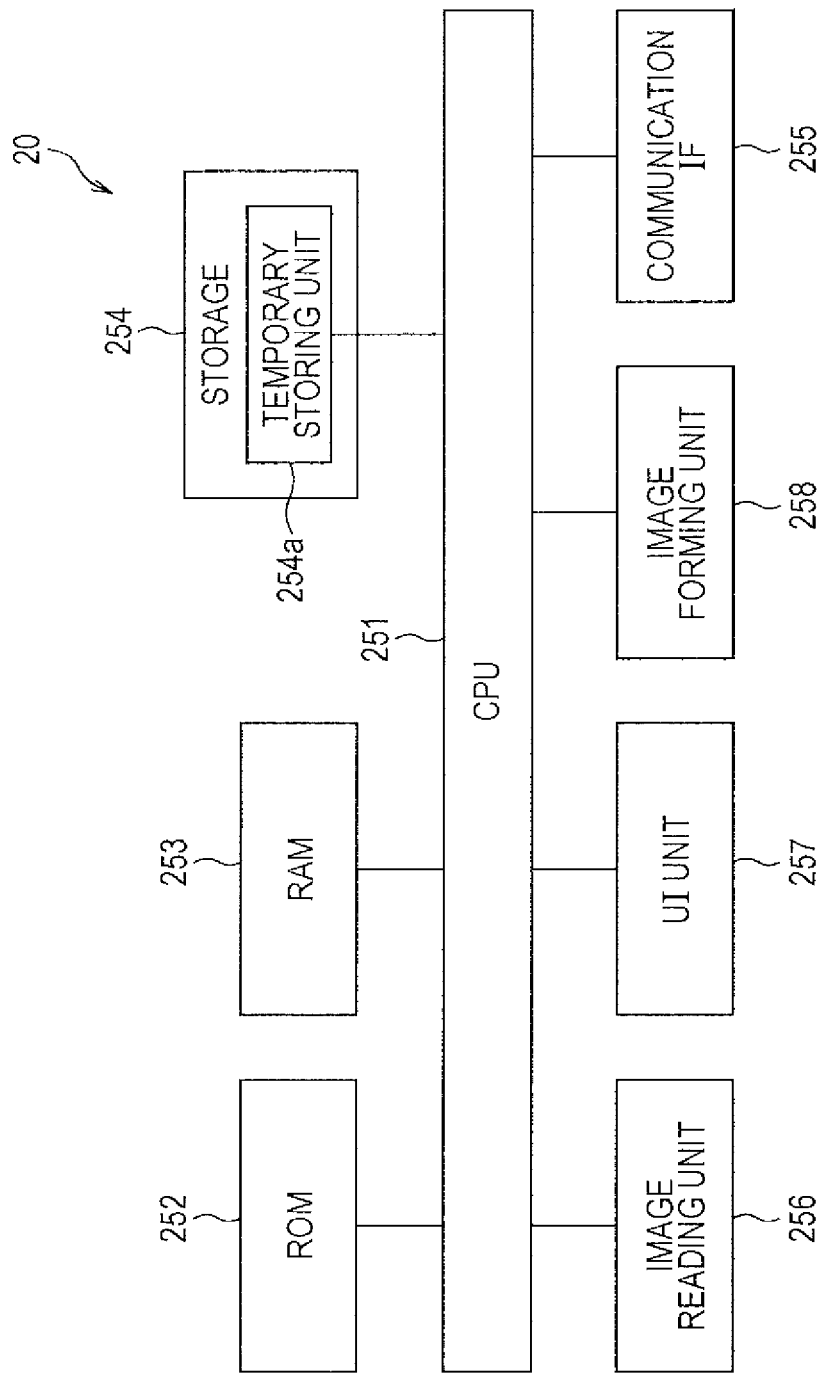
FIG. 3 is a diagram illustrating a hardware configuration of the image forming apparatus.

FIG. 3 is a diagram illustrating an example of a hardware configuration of the image forming apparatus 20. The image forming apparatus 20 includes a central processing unit (CPU) 251, a read only memory (ROM) 252, a random access memory (RAM) 253, a storage 254, a communication interface (IF) 255, an image reading unit 256, a user interface (UI) unit 257, and an image forming unit 258. The CPU 251 is a controller (processor) for controlling each unit of the image forming apparatus 20. The ROM 252 is a nonvolatile memory which stores a program and data. The RAM 253 is a volatile principal memory which functions as an operation region for the CPU 251 to execute a program. The storage 254 is a nonvolatile auxiliary memory which stores a program and data. The communication IF 255 is an interface which allows communication via the communication line 2. In particular, in this example, the communication IF 255 is an interface which allows communication with the client apparatus 10.

The image reading unit 256 performs image reading processing for reading, for example, using a charge coupled devices (CCD) method, an image rendered in an original. The UI unit 257 includes, for example, a touch screen and a keyboard. The image forming unit 258 forms, for example, using an electrophotographic method, an image corresponding to image data on a medium such as paper. The above method used for image reading or image formation is merely an example. A different method may be used for image reading or image formation.

In this example, when a program stored in the storage 254 is executed by the CPU 251, the functions illustrated in FIG. 2 are implemented. The CPU 251 which executes a program is an example of the reading unit 21, the extraction unit 22, the rewriting unit 23, the processing unit 24, and the memory controller 25. The storage 254 is an example of the storing region 26.

Plural applications are installed in the image forming apparatus 20, and plural services are provided by the plural applications. Services to be provided include, for example, a "scan to email" service for reading an image of an original and transmitting image data using an email and a "scan to server" service for reading an image of an original and storing image data into a server.

A service is launched when a button corresponding to the service on a menu screen displayed on the UI unit 257 is selected by a user. The menu screen is provided by a menu management unit which is implemented by the CPU 251. The menu management unit controls arrangement of buttons on the menu screen and launching of a service. The launching of a service and arrangement of buttons on the menu screen are implemented when service information (an example of shortcut information) indicating the contents of the service is exchanged between an application and the menu management unit.

Furthermore, the image forming apparatus 20 includes a function for shortcut launching of the above services. A user registers a desired service as a shortcut with the image forming apparatus 20. Service information is managed in association with user information. The menu management unit reads service information stored in the storage 254, and displays a shortcut menu on the UI unit 257.

FIG. 4 is a diagram illustrating an example of service information. Referring to FIG. 4, service information includes an identification parameter, a display parameter, and a launch parameter. The identification parameter and the display parameter are fixed values, and the launch parameter is variable. The identification parameter is information indicating which service of which application the service is. The identification parameter includes identification information for identifying an application and identification information for identifying a service. The display parameter stores information for displaying a button on a menu. Specifically, the display parameter is, for example, information indicating the title of a button, icon information, information indicating display or non-display, information indicating availability or non-availability, and information indicating presence or absence of a shortcut.

The launch parameter stores a parameter to be transmitted to an application when a button on the menu screen is pressed. The launch parameter is an example of a parameter for shortcut launching of a service. The launch parameter is, for example, an email address as a transmission destination of image data and a uniform resource locator (URL) as a storing destination of image data. Furthermore, the launch parameter may be, for example, a setting value for printing processing such as "monochrome/color", "single-sided/double-sided", "1 up/2 up/4 up, . . . ", and "with NOTE/without NOTE".

A user registers a shortcut that the user desires to use with the image forming apparatus 20. When an instruction for registering the shortcut is issued by the user, the CPU 251 of the image forming apparatus 20 generates service information including a launch parameter to be used for the shortcut, and stores the service information in the storage 254 in association with user information. Furthermore, the user edits, using the UI unit 257, the service information registered by the user, in an appropriate manner.

Figure 5:
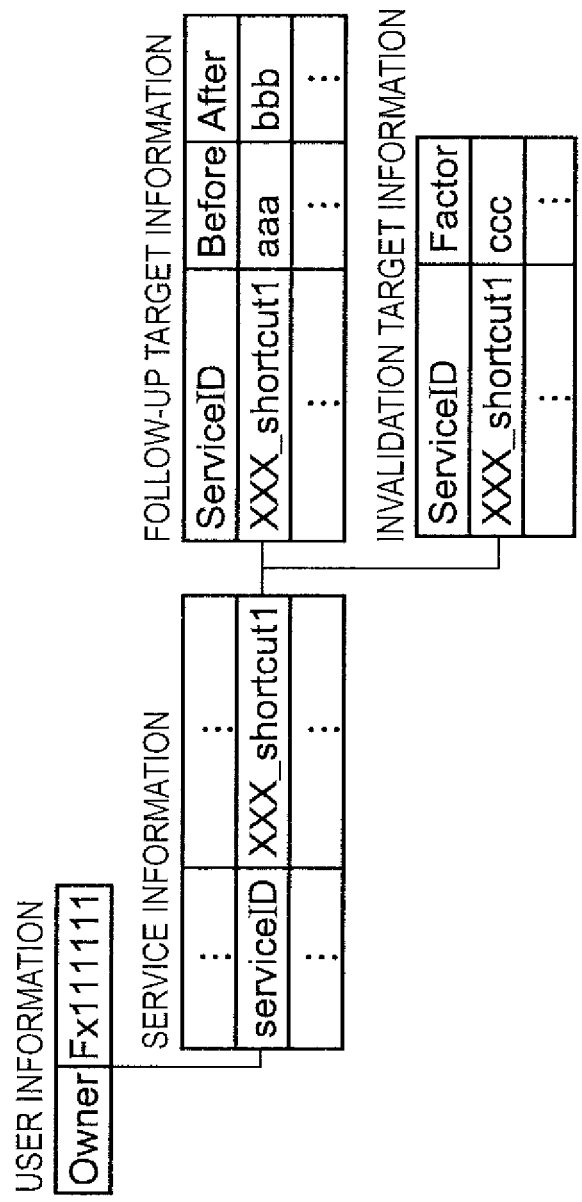
FIG. 5 is a diagram illustrating the relationship between service information and other types of information.

FIG. 5 is a diagram illustrating the relationship between service information and other types of information in this exemplary embodiment. Referring to FIG. 5, user information includes a user ID (identification information) for identifying a user and an address indicating a storing destination of service information. In the explanation provided below, for the convenience of explanation, service information registered with the image forming apparatus 20 for allowing a user to use a shortcut function will be referred to with "shortcut information".

In this exemplary embodiment, in the case where an instruction for changing a value of a setting item is issued by a user, the image forming apparatus 20 performs processing for causing shortcut information that includes the value of the instructed setting item before the change as a parameter value to reflect the change of the value. In this exemplary embodiment, in the reflection processing, follow-up target information and invalidation target information are used. The follow-up target information is information for remembering, in the case where there is a difference between a timing at which setting is changed and a timing at which the change is reflected in a parameter value of a shortcut, the contents of the change of the setting value until the timing at which the change is reflected. The case where there is a difference between the timings may be, for example, a case where a user who issues an instruction for changing setting is different from a user who is associated with shortcut information. Specifically, the case may be, for example, a case where when an administrator desires to reduce the charge amount, a parameter value of shortcut information of a general user is changed (for example, a change from "color" into "monochrome", a change from "single-sided" into "double-sided", etc.). Furthermore, the case may be, for example, a case where an email address of a certain user is set as a parameter value of shortcut information of a different user (for example, a transmission destination address for "scan to email").

Follow-up target information is generated when a user issues an instruction to change a setting value. Follow-up target information includes identification information for identifying shortcut information and a pair of setting values before and after a change. Follow-up target information is generated by the CPU 251, stored in the storage 254, and referred to when a user is allowed to select whether or not to change a parameter value.

Referring to FIG. 5, follow-up target information includes items "ServiceID", "Before", and "After". Identification information for identifying a service is stored as the item "ServiceID". A setting value before a change in the case where an instruction for changing a parameter value is issued is stored as the item "Before". A setting value after a change in the case where an instruction for changing a parameter value is issued is stored as the item "After".

Invalidation target information is information to be used for, when a user selects not to allow a change of a setting value to be reflected in a parameter value of shortcut information, temporarily not displaying the shortcut information (not being displayed on a menu screen). In invalidation target information, items "ServiceID" and "Factor" are associated with each other. Identification information for identifying a service is stored as the item "ServiceID". Information indicating a factor of non-display is stored as the item "Factor".

In the example of FIG. 5, user information and service information are associated with each other by an address included in the user information. Furthermore, follow-up target information and invalidation target information are associated with service information by a service ID of the service information.

Figure 6:
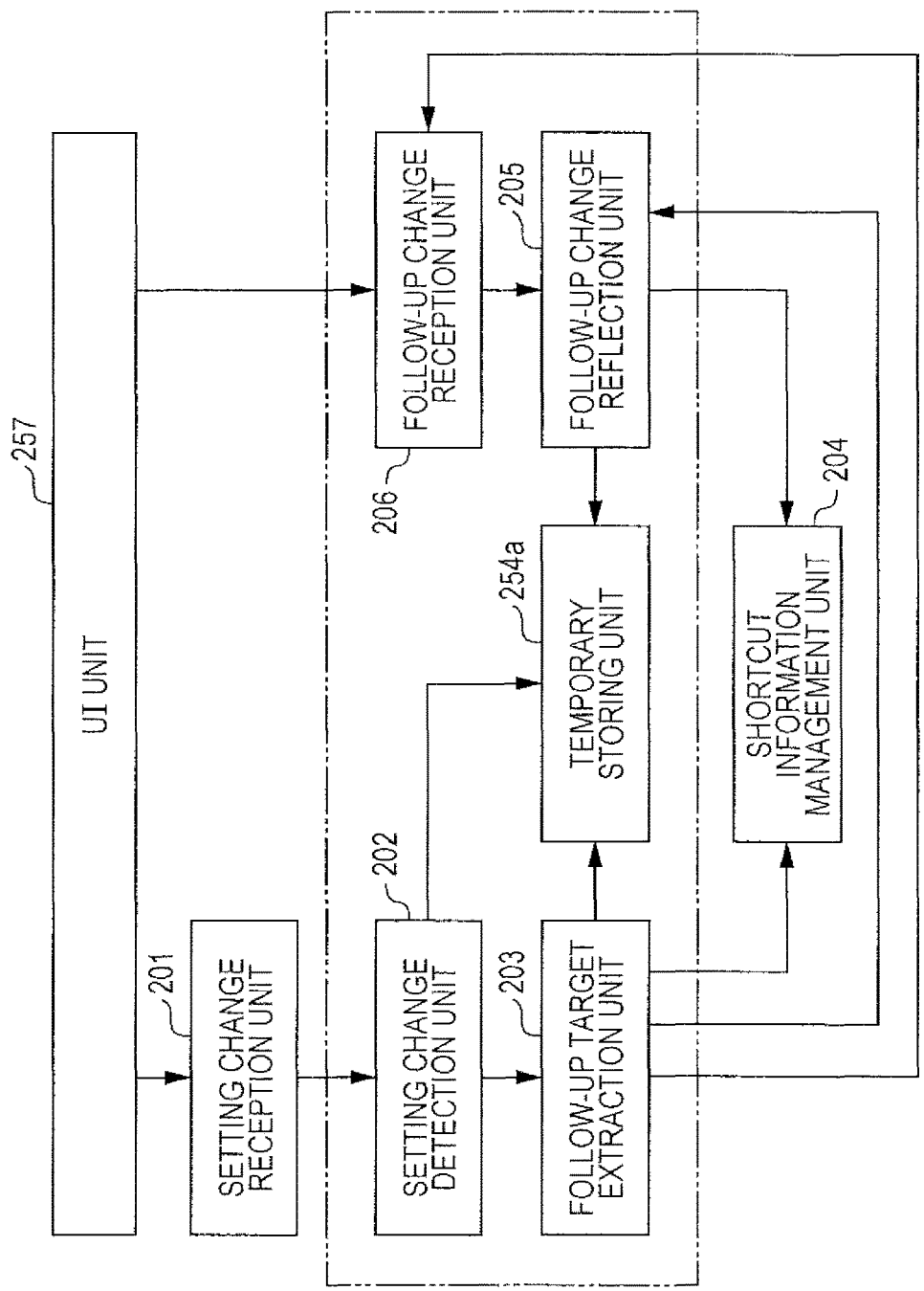
FIG. 6 is a diagram illustrating a functional configuration of the image forming apparatus.

FIG. 6 is a diagram illustrating an example of a functional configuration of the image forming apparatus 20 according to this exemplary embodiment. Individual units illustrated in FIG. 6 are implemented when the CPU 251 of the image forming apparatus 20 reads and executes a program stored in the ROM 252 or the storage 254. Referring to FIG. 6, the image forming apparatus 20 includes a setting change reception unit 201, a setting change detection unit 202, a follow-up target extraction unit 203, a shortcut information management unit 204, a follow-up change reflection unit 205, and a follow-up change reception unit 206. The setting change reception unit 201 receives a request for changing a setting value by a user. The setting change detection unit 202 is introduced in advance to a setting service having setting which may be used by a shortcut, and detects reception of a setting change for the setting service. The follow-up target extraction unit 203 extracts shortcut information which includes a setting value before a change as a parameter value. The shortcut information management unit 204 includes a storing region in which shortcut information is stored, and manages processing regarding the shortcut information. The follow-up change reflection unit 205 allows a setting value change requested by a user to be reflected in shortcut information. The follow-up change reception unit 206 receives a request for changing a setting value.

[2] Operation

In this exemplary embodiment, in the case where an instruction for changing a value of a setting item is issued by a user, the image forming apparatus 20 allows shortcut information including the value as a parameter value to reflect the change. At this time, a determination as to whether or not to allow the shortcut information to reflect the change is made according to the selection by the user. In the case where a shortcut is not allowed to reflect a setting change, the shortcut is in a non-display state in which the shortcut is not displayed on the menu screen, and therefore, the user is not able to use the shortcut. The shortcut in the non-display state is displayed again when the setting value is returned to the original value. In the explanation provided below, allowing a setting value change instructed by a user to be reflected in a parameter value of a shortcut will be referred to as "follow-up change". Furthermore, in the explanation provided below, re-displaying a shortcut in a non-display state will be referred to as "re-validate". Hereinafter, first, a follow-up change process for a shortcut will be described with reference to drawings, and then, a re-validation process for a shortcut will be described with reference to drawings.

[2-1] Follow-Up Change Process for Shortcut

A user of the image forming apparatus 20 performs an operation for logging into the image forming apparatus 20 using the UI unit 257 or a UI unit of the client apparatus 10. Specifically, a user performs, for example, an operation for inputting a user ID for identifying a user and a password. The CPU 251 performs login processing in accordance with information output from the UI unit 257 or the client apparatus 10.

Figure 7A:
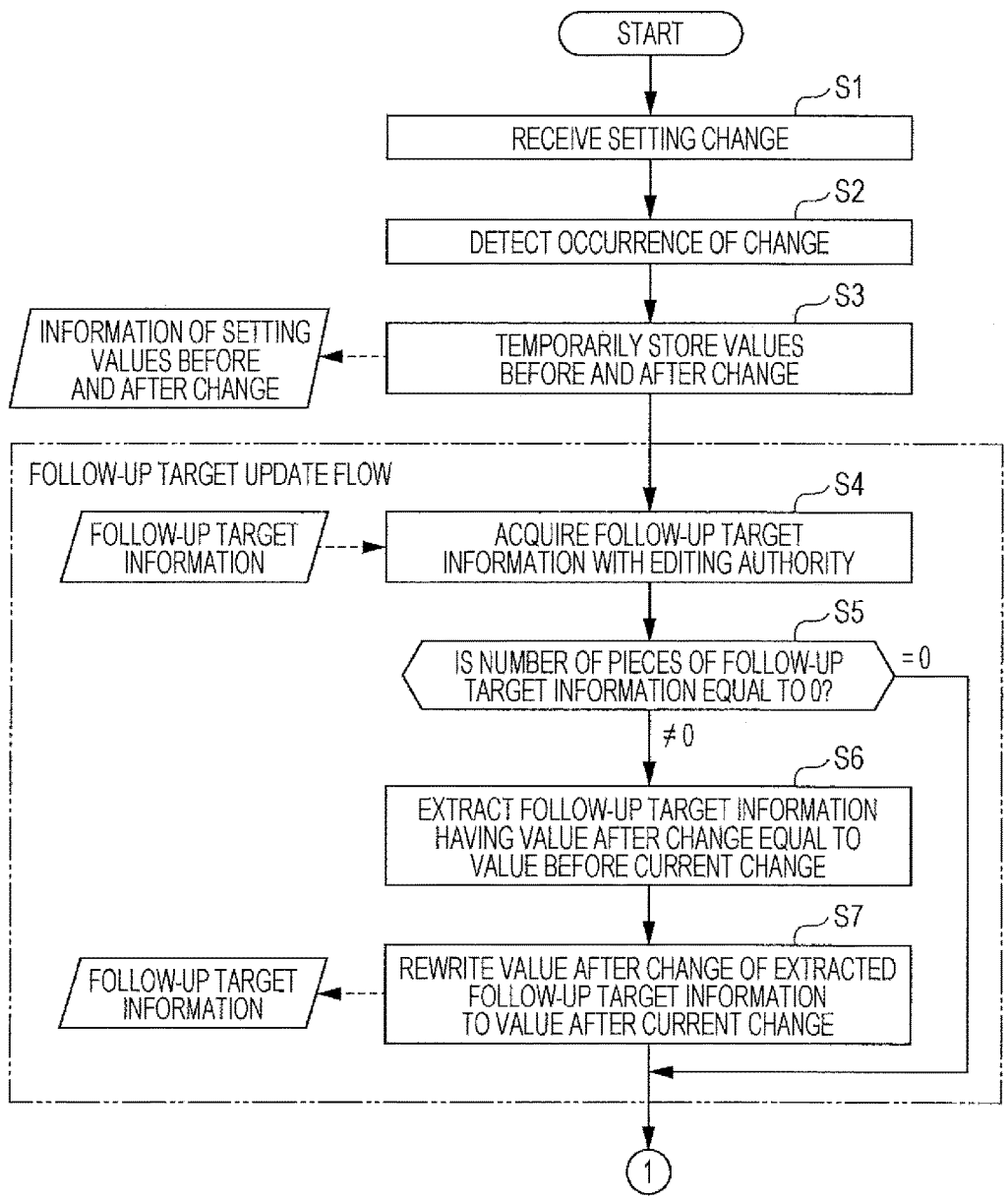
FIGS. 7A and 7B are flowcharts illustrating an example of a process performed by the image forming apparatus.
Figure 7B:
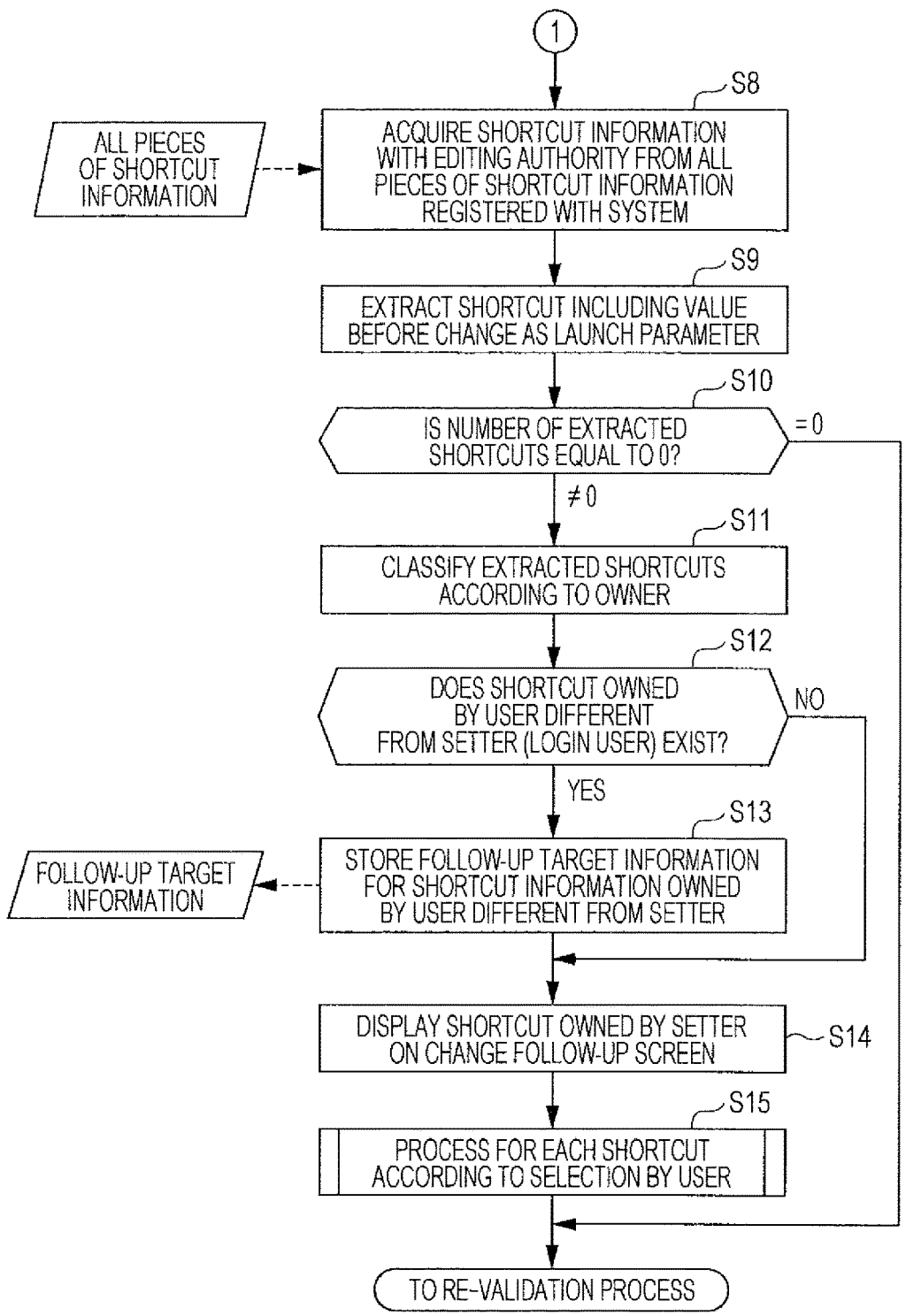

FIGS. 7A and 7B are flowcharts illustrating the flow of a process performed by the image forming apparatus 20. In step S1 of FIG. 7A, the setting change reception unit 201 receives an instruction for changing setting which is issued by a user who logged in (hereinafter, referred to as a "login user") or the system. A change instruction by the system is output by a backup function and a restore function included in the image forming apparatus 20. In contrast, a setting change by a user represents a case where, for example, a certain user changes his/her own address "fuji.taro@aaabbb.co.jp" within a destination table into "fuji-taro@aaabbb.co.jp". The user performs an operation for changing the address using the UI unit 257 of the image forming apparatus 20 or the UI unit of the client apparatus 10. The CPU 251 generates an instruction for changing an address in accordance with the contents operated by the user. The change instruction includes a user ID for identifying the user, an item ID for identifying a setting item, and a setting value after the change (for example, "fuji-taro@aaabbb.co.jp").

In step S2, the setting change detection unit 202 detects a change of setting. In step S3, the setting change detection unit 202 stores a set of a value before the current setting change (for example, "fuji.taro@aaabbb.co.jp") and a value after the change (for example, "fuji-taro@aaabbb@co.jp") in a temporary storing unit 254a.

FIG. 8 is a diagram illustrating an example of a data set stored in the temporary storing unit 254a. Referring to FIG. 8, the data set includes items "Before" and "After" which are associated with each other. A value before the current setting change is stored as the item "Before". A value after the change is stored as the item "After".

Referring back to FIG. 7A, in step S4, the setting change detection unit 202 launches the follow-up target extraction unit 203. First, the follow-up target extraction unit 203 acquires from a follow-up target information storing region 254c follow-up target information including editing authority assigned to the user. In this example, in the case where a login user is a general user, the follow-up target extraction unit 203 identifies service information that is associated with user information of the login user, and acquires follow-up target information that is associated with the identified service information. In contrast, in the case where the login user is an administrative user, the follow-up target extraction unit 203 acquires all the pieces of stored follow-up target information.

FIG. 9 is a diagram illustrating an example of the follow-up target information acquired in step S4 of FIG. 7A. Follow-up target information includes identification information (ServiceID) for identifying a shortcut and a set of setting values before and after a change, and is managed by the shortcut information management unit 204.

Referring back to FIG. 7A, in step S5, the follow-up target extraction unit 203 determines whether or not the number of pieces of follow-up target information acquired in step S4 is equal to zero. In the case where the number of pieces of acquired follow-up target information is not equal to zero (step S5; ≠0), the follow-up target extraction unit 203 proceeds to processing of step S6. In contrast, in the case where no follow-up target information is acquired (step S5; =0), the follow-up target extraction unit 203 proceeds to processing of step S8.

In step S6, the follow-up target extraction unit 203 acquires from the temporary storing unit 254a values before and after the current setting change, and extracts follow-up target information having a value after change that is equal to the value before the current change, from among the acquired pieces of follow-up target information. Specifically, for example, in the case where the last setting change of follow-up target information is a change from "A" into "B" and the current setting change is a change from "B" into "C", the value after the last change, that is, "B", is equal to the value before the current change, that is, "B". Therefore, the follow-up target information is extracted.

In step S7, the follow-up target extraction unit 203 transmits the extracted follow-up target information and the value after the current setting change to the follow-up change reflection unit 205. The follow-up change reflection unit 205 rewrites the value after the change in the received follow-up target information into the value after the current change. The rewritten value is stored in the shortcut information management unit 204.

FIG. 10 is a diagram illustrating an example of rewritten follow-up target information. In this example, a value "After" is rewritten from "fuji.taro@aaabbb.co.jp" into "fuji-taro@aaabbb.co.jp".

In step S8 of FIG. 7B, the follow-up target extraction unit 203 acquires shortcut information including editing authority from among plural pieces of shortcut information stored in the shortcut information management unit 204. In this example, in the case where the login user is a general user, the follow-up target extraction unit 203 acquires service information that is associated with user information of the login user as shortcut information. In the explanation provided below, for the convenience of explanation, a user of user information that is associated with service information will be referred to as a "user who owns the service information". In contrast, in the case where the login user is an administrative user, the follow-up target extraction unit 203 acquires all the pieces of service information stored in the shortcut information management unit 204 as shortcut information. Furthermore, the follow-up target extraction unit 203 acquires values before and after a change from the temporary storing unit 254a.

In step S9, the follow-up target extraction unit 203 extracts shortcut information that includes a parameter for which a value before the change is set, from among the shortcut information acquired in step S8.

FIG. 11 is a diagram illustrating an example of the shortcut information extracted in step S8 of FIG. 7B. In FIG. 11, shortcut information in which "fuji.taro@aaabbb.co.jp" is set as a launch parameter is illustrated.

In step S10 of FIG. 7B, the follow-up target extraction unit 203 determines whether or not shortcut information is extracted in step S9. In the case where it is determined that shortcut information is extracted (Step S10; ≠0), the follow-up target extraction unit 203 proceeds to processing of step S11. In contrast, in the case where it is determined that no shortcut information is extracted (Step S10; =0), the follow-up target extraction unit 203 skips processing of steps S11 to S15, and proceeds to a re-validation process (refer to FIG. 7S).

In step S11, the follow-up target extraction unit 203 classifies the shortcut information extracted in step S9 according to the user. This processing is performed for classifying shortcut information into information to be follow-up changed at the current timing and information to be follow-up changed later (for example, when a different user logs in).

In step S12, the follow-up target extraction unit 203 determines whether or not shortcut information owned by a user different from the login user, that is, shortcut information of a user different from the login user, is included in the shortcut information extracted in step S9. In the case where it is determined that shortcut information of a user different from the login user is included in the extracted shortcut information (step S12; Yes), the follow-up target extraction unit 203 proceeds to processing of step S13. In contrast, in the case where it is determined that shortcut information of a user different from the login user is not included in the extracted shortcut information (step S12; No), the follow-up target extraction unit 203 skips the processing of step S13, and proceeds to processing of step S14.

In step S13, the follow-up target extraction unit 203 registers the shortcut information of the user different from the login user and follow-up target information including values before and after a change to the shortcut information management unit 204. Since a general user does not has authority for editing shortcut information of another user, the processing of step S13 is not performed in the case where the login user is a general user. The processing of step S13 is performed when the login user is an administrator.

In step S14, the follow-up target extraction unit 203 transmits the shortcut information of the login user to the follow-up change reception unit 206. The follow-up change reception unit 206 generates, based on the transmitted shortcut information, screen data for performing follow-up change, and displays the generated screen data on the UI unit 257.

Figure 12:
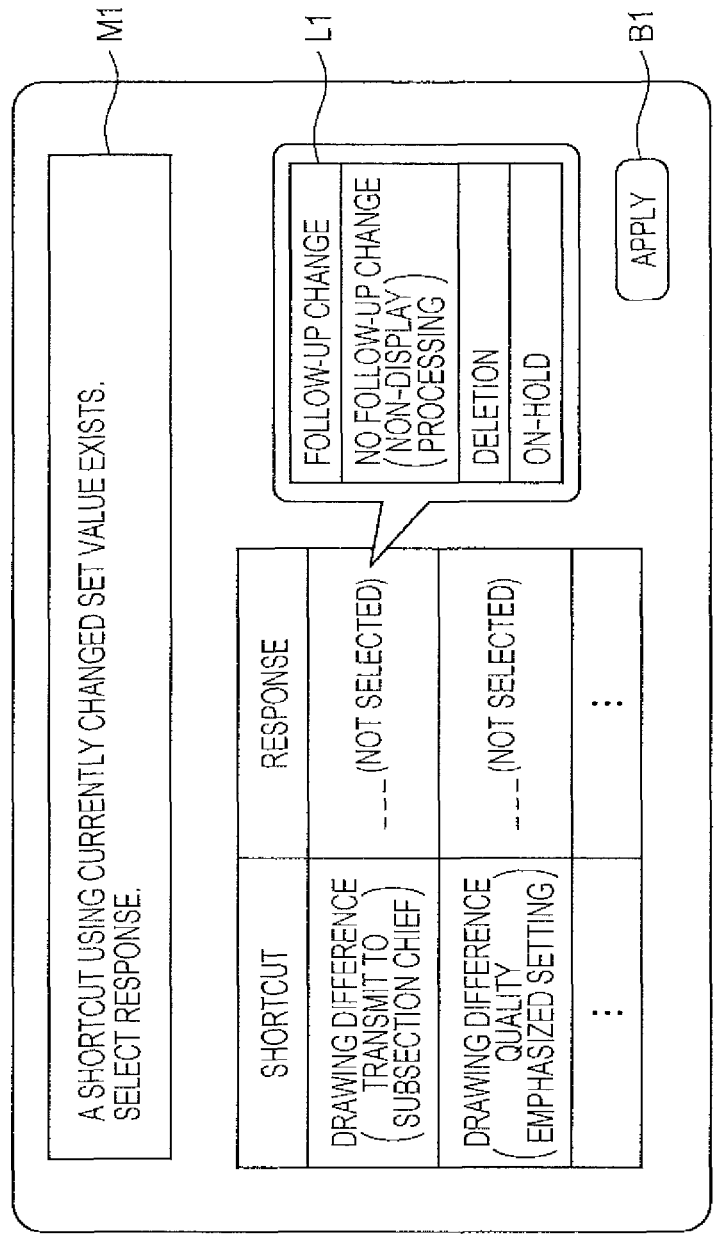
FIG. 12 is a diagram illustrating an example of a screen displayed on a UI unit.

FIG. 12 is a diagram illustrating an example of a screen displayed on the UI unit 257 in step S14. In the example of FIG. 12, a message M1 for prompting the user to make a selection is displayed, and a list L1 for allowing the user to select a response to each shortcut and a button B1 for determining the selection are displayed. The login user selects, in accordance with the screen displayed on the UI unit 257, follow-up change, no follow-up change, deletion, or on-hold, as processing to be performed for each piece of shortcut information.

In step S15 of FIG. 7B, the follow-up change reception unit 206 receives an operation by the login user, and performs processing for the shortcut information in accordance with the received operation. Specifically, the follow-up change reception unit 206 performs a process illustrated in FIG. 13.

Figure 13:
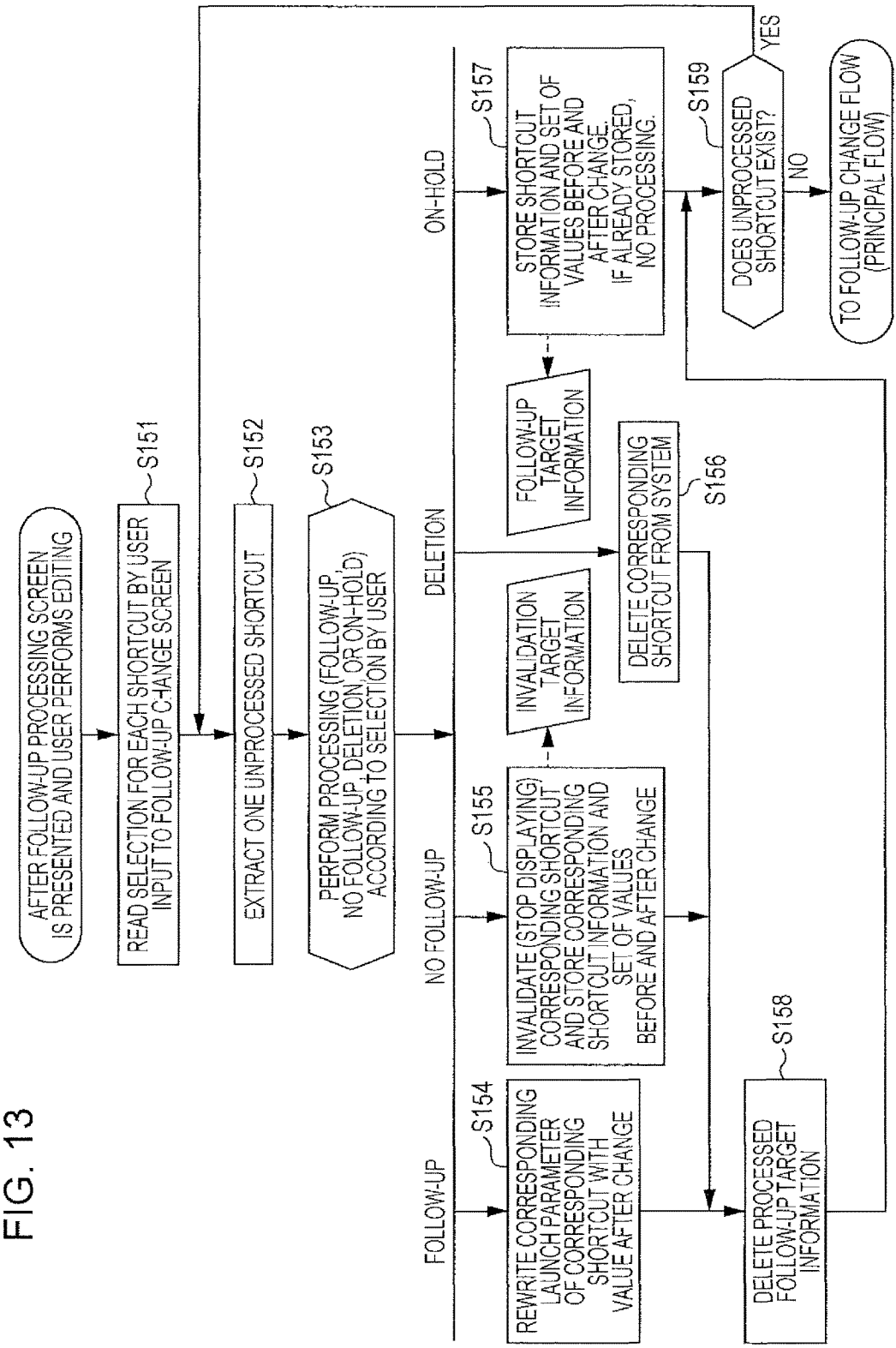
FIG. 13 is a flowchart illustrating an example of a process performed by the image forming apparatus.

FIG. 13 is a diagram illustrating the details of the processing of step S15 in FIG. 7B. In step S151, the follow-up change reception unit 206 reads selection for each shortcut by the user.

In step S152, the follow-up change reception unit 206 transmits data representing the response selected by the user to the follow-up change reflection unit 205. The follow-up change reflection unit 205 extracts one piece of unprocessed shortcut information, and starts application processing for the response selected by the user.

In step S153, the follow-up change reflection unit 205 sorts processing according to the response selected by the user. In this example, in the case where the user selects "follow-up change", the follow-up change reflection unit 205 proceeds to processing of step S154. In contrast, in the case where the user selects "no follow-up change", the follow-up change reflection unit 205 proceeds to processing of step S155. In the case where the user selects "deletion", the follow-up change reflection unit 205 proceeds to processing of step S156. In the case where the user selects "on-hold", the follow-up change reflection unit 205 proceeds to processing of step S157.

In step S154, the follow-up change reflection unit 205 requests the shortcut information management unit 204 to rewrite a parameter value included in the shortcut information with the value after the change. The shortcut information management unit 204 rewrites, in accordance with the request from the follow-up change reflection unit 205, the parameter value which is included in the shortcut information and which is equal to a setting value before the change, with a setting value after the change. After the processing of step S154, the follow-up change reflection unit 205 proceeds to processing of step S158.

FIG. 14 is a diagram illustrating an example of shortcut information in which the value of a launch parameter is rewritten. In this example, a parameter value of "SendAddress" of the shortcut information illustrated in FIG. 11 is rewritten from "fuji.taro@aaabbb.co.jp" into "fuji-taro@aaabbb.co.jp".

In step S155 of FIG. 13, the follow-up change reflection unit 205 requests the shortcut information management unit 204 to invalidate (stop displaying) a shortcut indicated by the shortcut information. In this example, "invalidating a shortcut" represents changing a status such that the shortcut is not displayed on the menu screen. Furthermore, the follow-up change reflection unit 205 requests the shortcut information management unit 204 to store the shortcut information and a set of values before and after the setting change as invalidation target information. After the processing of step S155, the follow-up change reflection unit 205 proceeds to processing of step S158.

FIG. 15 is a diagram illustrating an example of the invalidation target information stored in step S155. Invalidation target information includes identification information (ServiceID) for identifying a shortcut and a value as a factor of invalidation (a value before a change).

FIG. 16 is a diagram illustrating an example of shortcut information in which "Non-display (FALSE)" is set as a value of "Availability", which is a launch parameter indicating a display state.

In step S156 of FIG. 13, the follow-up change reflection unit 205 requests the shortcut information management unit 204 to delete the shortcut information. After the processing of step S156, the follow-up change reflection unit 205 proceeds to processing of step S158.

In step S157, the follow-up change reflection unit 205 requests the shortcut information management unit 204 to store the shortcut information and the set of values before and after the change as follow-up target information. In the case where the follow-up target information has already been stored, the follow-up change reflection unit 205 proceeds to processing of step S159 without performing the processing of step S157.

FIG. 17 is a diagram illustrating an example of the follow-up target information stored in step S157.

In step S158 of FIG. 13, the follow-up change reflection unit 205 requests the shortcut information management unit 204 to delete the follow-up target information processed in step S154, S155, or S158. After the processing of step S158, the follow-up change reflection unit 205 proceeds to processing of step S209.

In step S159, the follow-up change reflection unit 205 determines whether or not unprocessed shortcut information exists. In the case where it is determined that unprocessed shortcut information exists, the process returns to the processing of step S152. In contrast, in the case where it is determined that no unprocessed shortcut information exists, the follow-up change reflection unit 205 proceeds to the process illustrated in FIG. 8.

[2-2] Re-Validation Process for Shortcut

Figure 18:
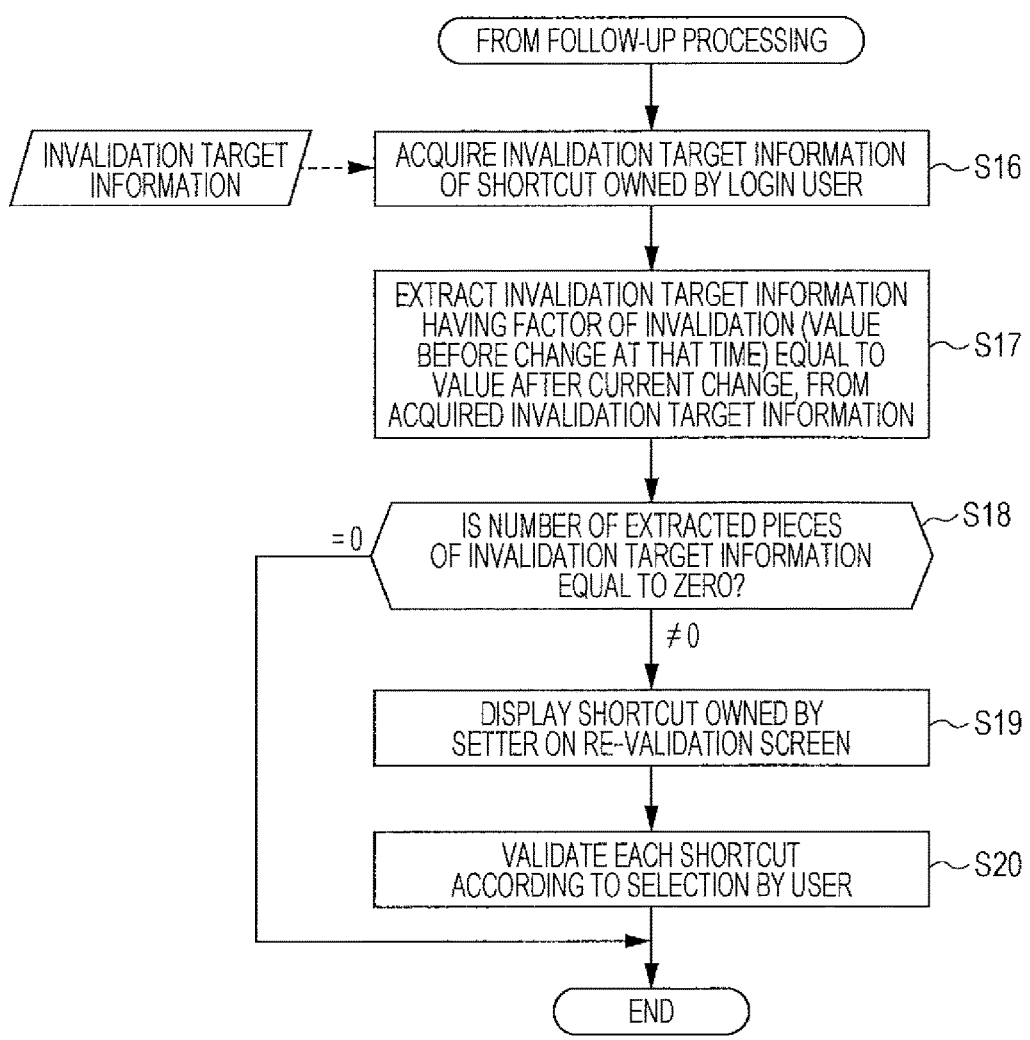
FIG. 18 is a flowchart illustrating the flow of a re-validation process.

FIG. 18 is a flowchart illustrating the flow of a process for re-displaying a shortcut in a non-display state (Re-validation process). For example, when a certain value is changed from "A" into "B", a shortcut indicated by shortcut information including a parameter having a setting value of "A" turns into a non-display state. After that, when the setting value is returned from "B" to "A", in this exemplary embodiment, invalidation is canceled, and the shortcut is displayed again. Cases where a shortcut is temporarily not displayed include, for example, a case where setting is temporarily changed to reduce the printing cost. Specifically, printing setting may be temporarily limited to monochrome printing from color printing. After that, cost reduction may be canceled, and setting may be returned to the original setting for color printing from setting for monochrome setting.

In step S16 of FIG. 18, the follow-up target extraction unit 203 acquires invalidation target information of the shortcut owned by the login user from the shortcut information management unit 204.

In step S17, the follow-up target extraction unit 203 acquires the value after the change from the temporary storing unit 254a, and extracts invalidation target information having a parameter value before the change of the shortcut information that is equal to the value after the current change, from among the acquired pieces of invalidation target information.

FIG. 19 is a diagram illustrating an example of the invalidation target information extracted in step S17. In this example, invalidation target information in which the value after the current change ("fuji-taro@aaabbb.co.jp") is set as "Factor" is extracted.

In step S18, the follow-up target extraction unit 203 determines whether or not invalidation target information is extracted in step S17. In the case where it is determined that invalidation target information is extracted (step S18; ≠0), the follow-up target extraction unit 203 proceeds to processing of step 319. In contrast, in the case where it is determined that no invalidation target information is extracted (step S18; =0), the follow-up target extraction unit 203 ends the process without performing the processing of step 319 or step S20.

In step S19, the follow-up target extraction unit 203 transmits the extracted invalidation target information to the follow-up change reception unit 206. The follow-up change reception unit 206 acquires shortcut information that is associated with the received invalidation target information from the shortcut information management unit 204. The follow-up change reception unit 206 generates, based on the acquired shortcut information, screen data for re-displaying the shortcut, and outputs the generated screen data to the UI unit 257, so that the screen data is displayed on the UI unit 257.

Figure 20:
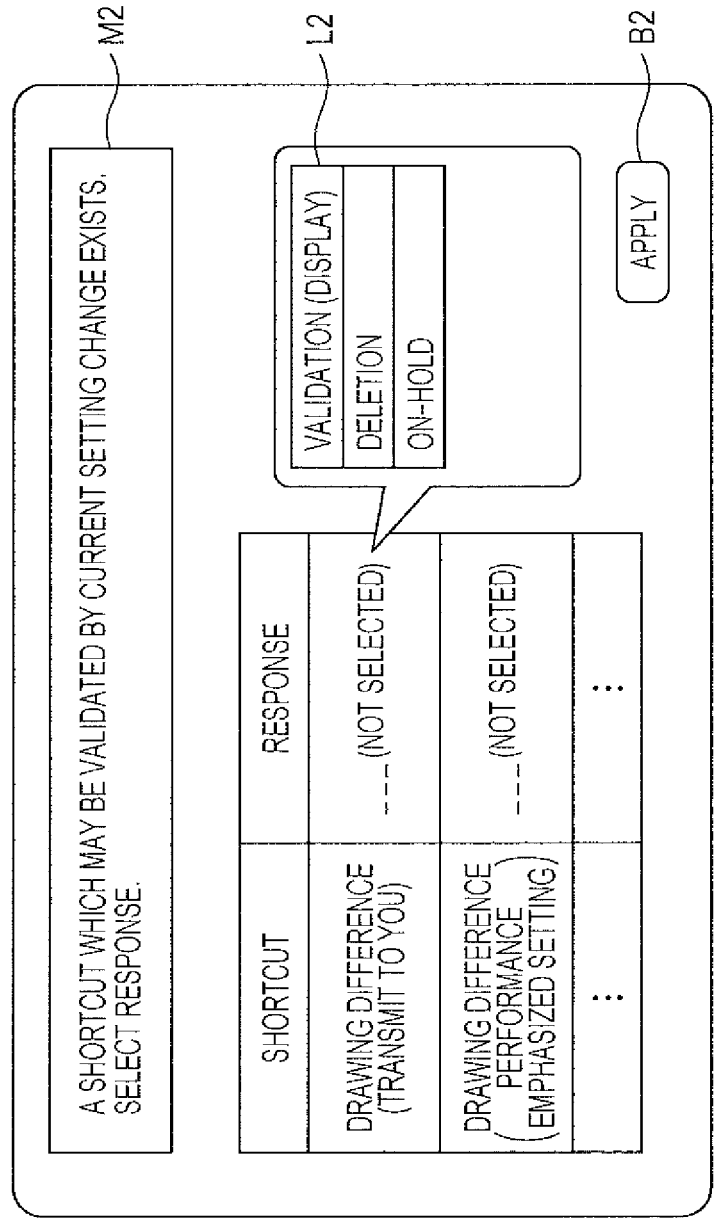
FIG. 20 is a diagram illustrating an example of a screen displayed on a UI unit.

FIG. 20 is a diagram illustrating an example of the screen displayed on the UI unit 257 in step S19. In this example, a message M2 for prompting the user to make a selection is displayed, and a list L2 for allowing the user to select a response to each shortcut and a button B2 for determining the selection are displayed. In the state in which the screen is displayed, the user selects, using the UI unit 257, processing to be performed for each piece of shortcut information (re-display or deletion of a shortcut).

Referring back to FIG. 18, in step 220, the follow-up change reception unit 206 receives a user operation on the screen for allowing the shortcut to be displayed again, and processes the shortcut information in accordance with the contents of the user operation. Specifically, the follow-up change reception unit 206 performs a process illustrated in FIG. 21.

Figure 21:
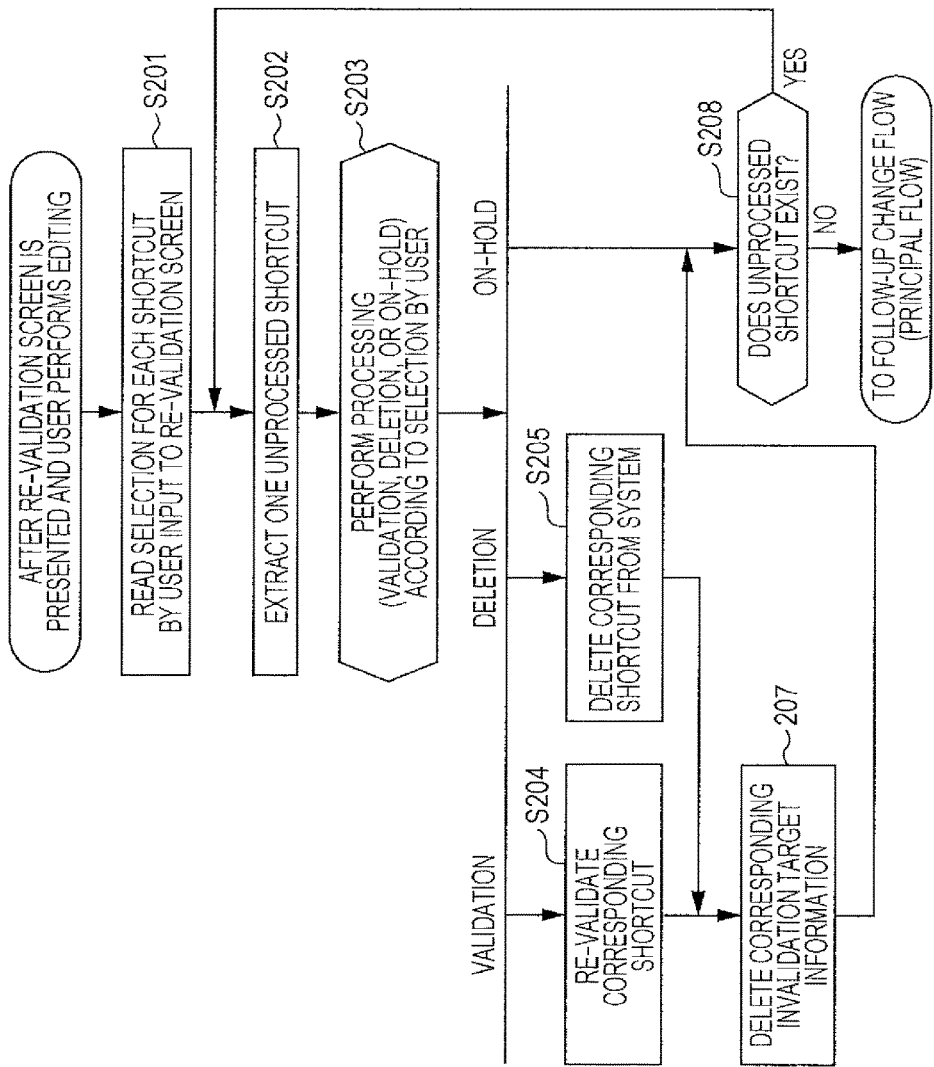
FIG. 21 is a flowchart illustrating an example of a process performed by the image forming apparatus.

FIG. 21 is a flowchart illustrating the details of the processing of step S20 in FIG. 18 performed by the follow-up change reception unit 206. In step S201, the follow-up change reception unit 206 reads selection for each shortcut by the user.

In step 3202, the follow-up change reception unit 206 transmits data representing the response selected by the user to the follow-up change reflection unit 205. The follow-up change reflection unit 205 extracts one piece of unprocessed shortcut information, and starts application processing for the response selected by the user.

In step S203, the follow-up change reflection unit 205 sorts processing according to the response selected by the user. In the case where "invalidation" is selected by the user, the follow-up change reflection unit 205 proceeds to processing of step S204. In contrast, in the case where "deletion" is selected by the user, the follow-up change reflection unit 205 proceeds to processing of step S205. In the case where "on-hold" is selected by the user, the follow-up change reflection unit 205 proceeds to processing of step S208.

In step S204, the follow-up change reflection unit 205 requests the shortcut information management unit 204 to re-display the extracted shortcut information. The shortcut information management unit 204 changes the value of a parameter indicating whether or not to display the shortcut information to a value representing display.

FIG. 22 is a diagram illustrating an example of shortcut information in which a parameter value is changed. In this example, the value of a launch parameter of "Availability" of the shortcut information is changed to "TRUE".

In step S205 of FIG. 21, the follow-up change reflection unit 205 requests the shortcut information management unit 204 to delete the extracted shortcut information.

In step S207, the follow-up change reflection unit 205 requests the shortcut information management unit 204 to delete the invalidation target information processed in step S204 or step S205.

In step S208, the follow-up change reflection unit 205 determines whether or not unprocessed shortcut information exists. In the case where unprocessed shortcut information exists, the follow-up change reflection unit 205 returns to the processing of step S202. In contrast, in the case where no unprocessed shortcut information exists, the follow-up change reflection unit 205 ends the process.

[2-3] Process Performed when Different User Logs in

Figure 23:
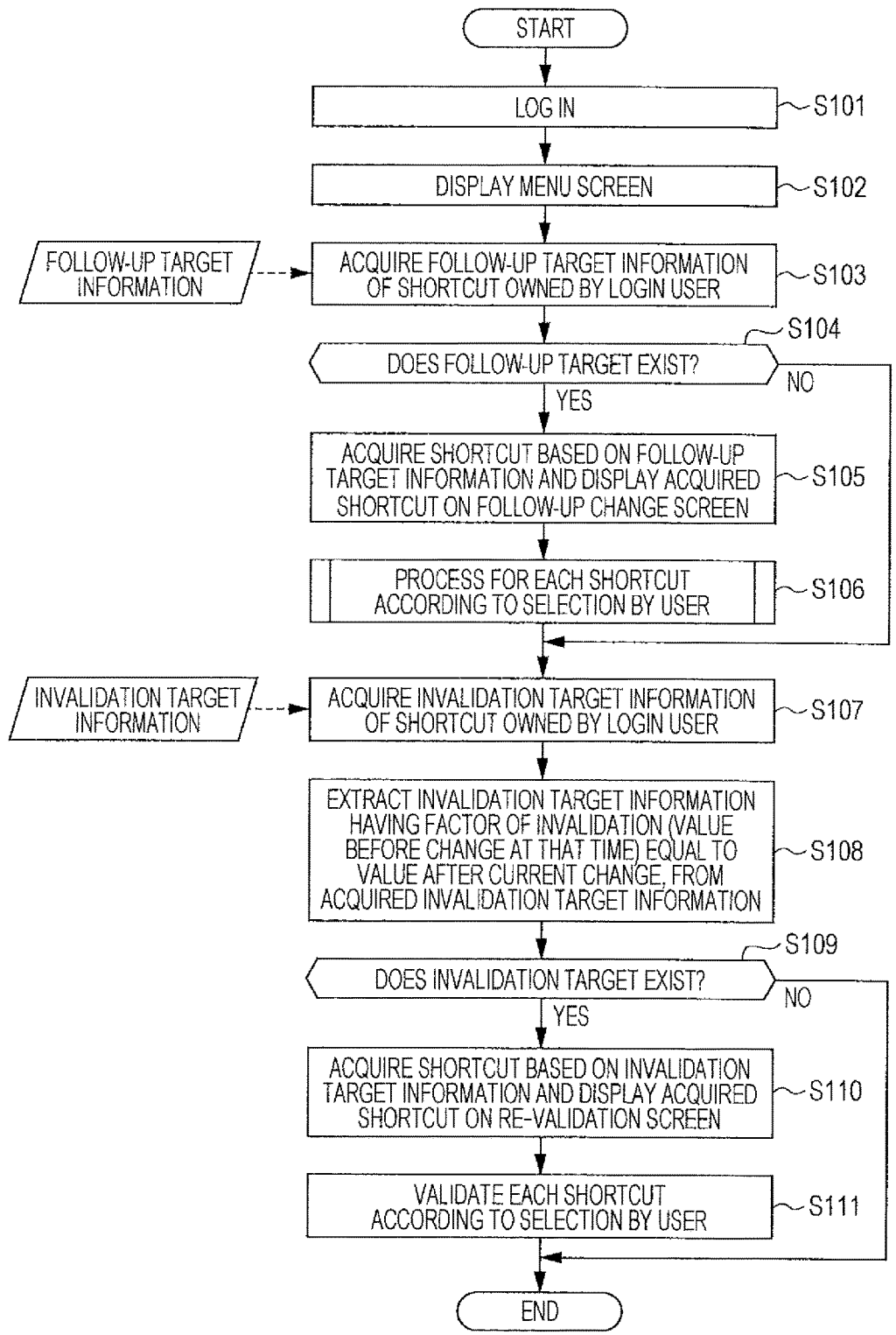
FIG. 23 is a flowchart illustrating an example of a process performed by the image forming apparatus.

FIG. 23 is a flowchart illustrating the flow of a follow-up change process performed for a user corresponding to shortcut information as a target of a follow-up change in the case where the user is different from a user who issued a setting change. A user of the image forming apparatus 20 performs an operation for logging into the image forming apparatus 20 using the UI unit 257. Specifically, the user performs, for example, an operation for inputting a user ID and a password. In step S101, the CPU 251 performs login processing in accordance with information output from the UI unit 257.

In step S102, the CPU 251 launches a menu application, and the menu application displays a menu screen. In step S103, the menu application launches the follow-up target extraction unit 203, and the follow-up target extraction unit 203 acquires from the shortcut information management unit 204 follow-up target information that is associated with shortcut information owned by the login user.

In step S104, the follow-up target extraction unit 203 determines whether or not follow-up target information is acquired. In the case where it is determined that follow-up target information is acquired (step S104; Yes), the follow-up target extraction unit 203 proceeds to processing of step S105. In contrast, in the case where it is determined that no follow-up target information is acquired (step S104; No), the follow-up target extraction unit 203 skips processing of steps S105 and S106, and proceeds to processing of step S107.

In step S105, the follow-up target extraction unit 203 transmits the extracted follow-up target information to the follow-up change reception unit 206. The follow-up change reception unit 206 acquires from the shortcut information management unit 204 shortcut information that is associated with the received follow-up target information. The follow-up change reception unit 206 generates, based on the acquired shortcut information, screen data for follow-up change, and displays the screen data on the UI unit 257.

In step S106, the follow-up change reception unit 206 receives a user operation, and processes the shortcut information in accordance with the contents of the user operation. Specifically, the follow-up change reception unit 206 performs the process illustrated in FIGS. 7A and 73. In the explanation provided above, the setting change reception unit 201 performs the process illustrated in FIGS. 7A and 7B. However, in step S106, instead of the setting change reception unit 201, the follow-up change reception unit 206 performs the process illustrated in FIGS. 7A and 7B.

In step S107, the follow-up target extraction unit 203 acquires from the shortcut information management unit 204 invalidation target information that is associated with the shortcut information owned by the login user.

In step S108, the follow-up target extraction unit 203 acquires the value after the change from the temporary storing unit 254a, and extracts invalidation target information having a value before change that is equal to the value after the current change, from among the acquired pieces of invalidation target information. That is, the follow-up target extraction unit 203 confirms whether or not processing for returning the changed setting value to the original value has been performed.

In step S109, the follow-up target extraction unit 203 determines whether or not invalidation target information is extracted. In the case where it is determined that invalidation target information is extracted (step S109; Yes), the follow-up target extraction unit 203 proceeds to processing of step S110. In contrast, in the case where it is determined that no invalidation target information is extracted (step S109; No), the follow-up target extraction unit 203 skips processing of steps S110 and S111, and ends the process.

In step S110, the follow-up target extraction unit 203 transmits the extracted information to the follow-up change reception unit 206. The follow-up change reception unit 206 acquires from the shortcut information management unit 204 shortcut information that is associated with the received invalidation target information. The follow-up change reception unit 206 generates, based on the acquired shortcut information, screen data for re-displaying the shortcut, and displays a screen represented by the generated screen data on the UI unit 257.

In step S111, the follow-up change reception unit 206 receives an operation by the user on the screen displayed in step S110, and performs processing for the shortcut information in accordance with the received contents. Specifically, the follow-up change reception unit 206 performs the process illustrated in FIG. 21.

As described above, in this exemplary embodiment, in the case where an instruction for changing the value of a setting item is issued by a user, the change is reflected in shortcut information which includes the value of the setting item before the change as a parameter value. Accordingly, the user does not separately correct the parameter value of the shortcut information, and thus an operation load regarding the correction by the user is reduced. Furthermore, a situation in which a shortcut does not operate because shortcut information is not corrected, may be suppressed.

Furthermore, in this exemplary embodiment, even in a case where a setting value is changed continuously plural times, such as a case where a setting value is changed from "A" into "B" and then changed from "B" into "C", a situation in which the change is not reflected in the parameter value of a shortcut may be suppressed.

[3] Modifications

The foregoing exemplary embodiment is merely an exemplary embodiment of the present invention and may be modified as described below. Furthermore, the foregoing exemplary embodiment and each of the modifications described below may be combined in an appropriate manner.

(1) In the foregoing exemplary embodiment, processing for allowing a user to select whether to perform follow-up change processing for shortcut information including a changed setting value is performed at a timing when a login user changes the setting value or a timing when a user different from the user who performed the setting change logs in. However, the timing at which the user is allowed to select whether or not to perform follow-up change processing is not limited to the above. The CPU 251 may perform processing for allowing the user to select whether or not to perform follow-up change processing at a predetermined timing. For example, at a timing when the user selects the shortcut on the menu screen, the CPU 251 may perform processing for allowing the user to select whether or not perform follow-up change processing.

(2) The above-mentioned functions regarding the image forming apparatus 20 may be shared among plural apparatuses. For example, the above-mentioned functions regarding the image forming apparatus 20 may be implemented by a print server including functions of the reading unit 21, the extraction unit 22, and the rewriting unit 23 of FIG. 2 and a system including an image forming apparatus including an image forming function.

(3) The image forming apparatus 20 may be a printer forming an image in a method different from the electrophotographic method. Furthermore, the image forming apparatus 20 may form monochrome images or color images.

(4) In the foregoing exemplary embodiment, a program executed by the CPU 251 of the image forming apparatus 20 may be downloaded via a communication line such as the Internet. Furthermore, the program may be stored in a computer-readable recording medium such as a magnetic recording medium (a magnetic tape, a magnetic disk, etc.), an optical recording medium (an optical disc etc.), a magneto-optical disc, and a semiconductor memory, and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
a processor programmed to
read, in response to receiving an instruction for changing a value of a setting item regarding a service to be provided by the data processing apparatus issued by a first user, a value of the instructed setting item before the change from a predetermined storing region;
extract shortcut information associated with the first user who has issued the instruction and a second user who is different from the first user, the extracted shortcut information including the value before the change as a parameter value from among plural pieces of shortcut information each including a parameter for shortcut launching of the service to be provided by the data processing apparatus; and
rewrite the parameter value included in the extracted shortcut information to a designated value, in accordance with the instruction for changing the value of the setting item, such that when the second user operates the shortcut for launching the service, the service is provided by the data processing apparatus using the parameter value rewritten as the designated value.

2. The data processing apparatus according to claim 1, wherein the processor is further programmed to perform processing for allowing the first user to select whether or not to change the parameter value included in the extracted shortcut information, and in a case where changing the parameter value is selected by the first user, rewrite the parameter value included in the extracted shortcut information to the designated value.

3. The data processing apparatus according to claim 2, wherein the processor is further programmed to store the extracted shortcut information and at least one data set including values of the instructed setting item before and after the change in association with each another in a predetermined storing region, the shortcut information being stored in a predetermined storing region in association with identification information for identifying a user, perform processing for allowing the second user corresponding to the extracted shortcut information to select whether or not to change the parameter value when the second user corresponding to the extracted shortcut information logs in, and in a case where changing is selected by the second user, rewrite the parameter value included in the stored shortcut information to the stored value after the change.

4. The data processing apparatus according to claim 2, wherein the processor is further programmed to store, in a case where not changing is selected by the first user, the extracted shortcut information and at least one data set including values of the instructed setting item before and after the change in a predetermined storing region, the shortcut information being stored in a predetermined storing region in association with identification information for identifying a user, perform the processing for allowing the first user to select whether or not to change the parameter value at a predetermined timing, and in a case where changing is selected by the first user, rewrite the parameter value included in the stored shortcut information to the stored value after the change.

5. The data processing apparatus according to claim 2, wherein in a case where not changing the parameter value is selected by the first user, the processor performs setting for not displaying a shortcut represented by the extracted shortcut information on a menu screen, and in a case where an instruction for returning the value of the setting item to an original value is issued by the first user, the processor performs setting for displaying the shortcut represented by the extracted shortcut information on the menu screen.

6. The data processing apparatus according to claim 3, wherein the processor extracts, from the stored at least one data set, a data set including a value after change that is equal to the value of the instructed setting item before the change, and rewrites the value after change included in the extracted data set to the value of the instructed setting item after the change.

7. The data processing apparatus according to claim 4, wherein the processor extracts, from the stored at least one data set, a data set including a value after change that is equal to the value of the instructed setting item before the change, and rewrites the value after change included in the extracted data set to the value of the instructed setting item after the change.

8. A data processing method comprising:

reading, in response to receiving an instruction issued by a first user for changing a value of a setting item regarding a service to be provided, a value of the instructed setting item before the change from a predetermined storing region;

extracting shortcut information associated with the first user who has issued the instruction and a second user who is different from the first user, the extracted shortcut information including the value before the change as a parameter value from among plural pieces of shortcut information each including a parameter for shortcut launching of the service to be provided; and rewriting the parameter value included in the extracted shortcut information to a designated value, in accordance with the instruction for changing the value of the setting item, such that when the second user operates the shortcut for launching the service, the service is provided using the parameter value rewritten as the designated value.

9. A non-transitory computer readable medium storing a program causing a computer to execute a process for data processing, the process comprising:

reading, in response to receiving an instruction issued by a first user for changing a value of a setting item regarding a service to be provided, a value of the instructed setting item before the change from a predetermined storing region;

extracting shortcut information associated with the first user who has issued the instruction and a second user who is different from the first user, the extracted shortcut information including the value before the change as a parameter value from among plural pieces of shortcut information each including a parameter for shortcut launching of the service to be provided; and rewriting the parameter value included in the extracted shortcut information to a designated value, in accordance with the instruction for changing the value of the setting item, such that when the second user operates the shortcut for launching the service, the service is provided using the parameter value rewritten as the designated value.

* * * * *